UNITED STATES PATENT OFFICE.

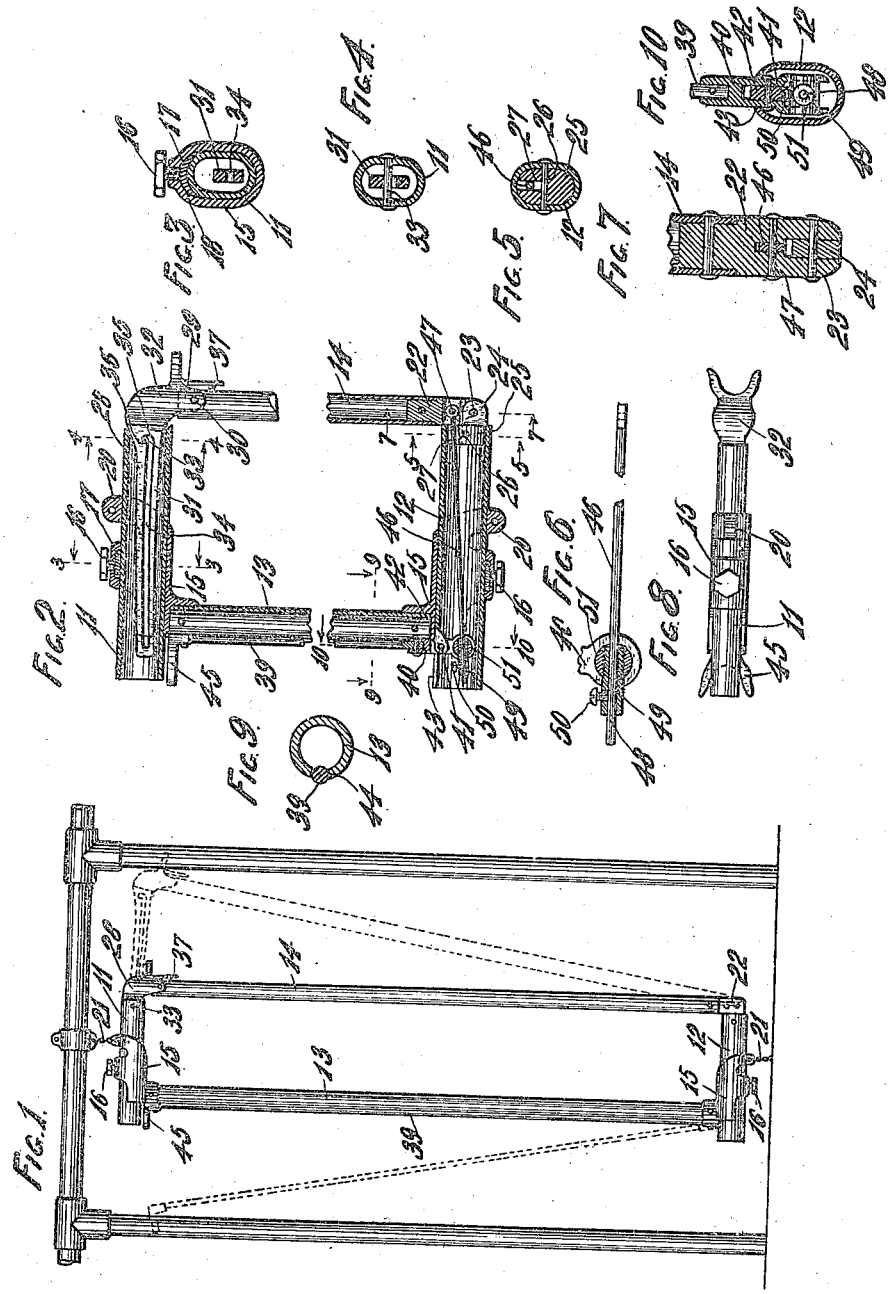

LOUIS O. FRENCH, OF MILWAUKEE, WISCONSIN.

STANCHION.

1,239,784.

Specification of Letters Patent.  Patented Sept. 11, 1917.

Application filed February 23, 1917. Serial No. 150,362.

*To all whom it may concern:*

Be it known that I, LOUIS O. FRENCH, a citizen of the United States, and resident of Milwaukee, in the county of Milwaukee and State of Wisconsin, have invented new and useful Improvements in Stanchions, of which the following is a description, reference being had to the accompanying drawings, which are a part of this specification.

The invention relates to stanchions.

The invention is designed to provide a new and improved form of stanchion together with a movable guard carried thereby and simultaneously movable with the side bar thereof.

Heretofore it has been the practice to provide either the relatively immovable side bar of the stanchion or the stall frame with a fixed guard or to mount movable guards on the stall frame to prevent the animal entering its head between the stanchion and the adjacent stall upright when driven into the stall.

The fixed guards are objectionable because they prevent the animal turning its head around on that side of the stanchion and thus hinders its comfort and free movement while the movable guards on the stalls mean additional equipment and installation and have to be operated separately from the stanchion. To overcome the difficulties of these earlier constructions I have designed a movable guard carried by the stanchion, and operable with the operation of the movable side bar, the guard not interfering in any way with the free movement of the animal when held within the stanchion and opening to guarding position between the fixed side bar and the stall frame when the said bar is swung open.

The invention is further designed to provide a simple, efficient and sanitary combined stanchion and guard, the guard operating means being inclosed within a part of the stanchion frame and the cost of the guard not adding materially to the cost of the stanchion due to the construction employed.

The invention is further designed to provide a simple and sanitary form of lock for securing the stanchion closed and for guiding the movable side, this lock and guide in this application being a continuation of an application filed by me on May 25, 1916, Serial No. 99,746, the locking mechanism being inclosed within the tubular top bar of the stanchion and consisting of a locking guide pin or its equivalent secured within the top bar and a locking guide member secured to the movable side bar and running on said pin so arranged and constructed as to permit the ready opening of the stanchion by a slight pressure of the hand upon the guide member and to permit the ready closing of the stanchion with one hand, the stanchion being locked closed automatically when the guide is pushed home within the hollow top bar.

The invention is further designed to provide a guard in combination with an adjustable stanchion, the guard being simultaneously operable with the movable side bar.

The invention further consists in the several features hereinafter set forth and more particularly defined by claims at the conclusion hereof.

In the drawings:

Figure 1 is a view of the device embodying the invention, the guard and side bar being shown in open position in dotted lines;

Fig. 2 is a vertical sectional view of the device, parts being broken away;

Fig. 3 is a section taken on the line 3—3 of Fig. 2;

Fig. 4 is a section taken on the line 5—5 of Fig. 2;

Fig. 5 is a detail view of the link, parts being broken away and parts being shown in section;

Fig. 6 is a section taken on the line 7—7 of Fig. 2;

Fig. 7 is a top view of the stanchion;

Fig. 8 is a section taken on the line 8—8 of Fig. 2;

Fig. 9 is a section taken on the line 9—9 of Fig. 2.

Fig. 10 is a section taken on the line 10—10 of Fig. 2.

In general the device comprises tubular top and bottom bars 11 and 12, a relatively fixed side bar 13, means for adjustably securing said fixed bar to said top and bottom bars, a movable side bar 14, means for locking and guiding the side bar, a guard, and means connected to said guard and side bar to permit their simultaneous movement into and out of guarding position.

The means for securing said fixed bar 13 to the top and bottom bars consists of brackets 15 secured to the end said bar 13 and slidably embracing the top and bottom bars respectively, and means for adjustably clamping said brackets to said top and bottom bars. This clamping means in each instance consists of a clamping screw 16 having a threaded engagement with the upper portion of the bracket and bearing upon a wedge block 17 disposed in a recess 18 in the bracket and interposed between said bracket and the tubular bar upon which said bracket is mounted. The wedge blocks provide a considerable bearing and clamping surface so that the bracket is securely clamped to the bar, the brackets having apertured projecting ends 20 for receiving any suitable fastening means, as chains 21. The side bar 13 with its brackets and the top and bottom bars form what may be termed the relatively fixed parts of the stanchion.

The removable side bar is pivotally secured to the bottom bar 12 by a forked fitting 22 which is pivotally secured at its lower end by a bolt 23 passing through a lug 24 on a block 25 fitting within and secured to the bottom bar 12 by a rivet or bolt 26, said block having a slot 27 therein for a purpose hereinafter described.

The means for locking and guiding the movable side bar consists of a locking guide member 28 pivotally secured at one end 29 to the upper end of the side bar 14 by a pivot bolt 30 and having a guide portion 31 and a handle portion 32, said guide portion coöperating with a locking guide means or pin 33 passing through and secured to the top bar 11. This guide portion is provided with a horizontally disposed longitudinally extending opening or slot 34 and the end of this slot is curved upwardly adjacent the handle portion 32 as at 35 and thence inwardly and downwardly to form an integral locking hook 36. The handle portion 22 forms a closure for the end of the top bar adjacent thereto and extends outwardly therefrom and is provided with forked arms 37 for engaging the adjacent stall standard when the stanchion is open, as shown in dotted lines in Fig. 1 to prevent the animal entering its head between the stanchion and said stall standard when driven into the stall. The pin 33 runs in the slot 34 and insures the proper movement of the side bar, the guide portion 31 being incased in the top bar when the stanchion is closed and it also serves to lock the said bar to the stanchion when closed by automatically engaging the hook 36. As most of the weight of the member 28 is on the inner side of the movable side bar there will be a natural tendency of the guide portion 31 to tip downwardly and thus tip the lock 36 downwardly so that on the inward movement of the stanchion in the closing of the stanchion said member will move along the pin until the pin 33 reaches the inner end 35 of the slot at which time the forward end of the guide member swings down by its own weight and the pin 33 is automatically seated behind the hook 36. This automatic locking of the side bar closed may be accomplished by the operator grasping the bar 14 at any point and exerting a slight force to move it inwardly. The weight of the member 28 is sufficient to hold the parts in locked position but if desired a spring 37 may be interposed between the handle 32 and the bar 14 so as to always exert pressure upon the member 28 to tilt its guide portion 31 downwardly. To unlock and open the stanchion the operator by a slight inward movement and a downwardly tilting of the extension or handle portion 32 causes the hook 36 to swing upwardly out of locking engagement with the pin or keeper 33 after which the movable side bar may be swung outwardly in open position, the member 28 moving over the pin 33 in the slot 34 and being guided thereby until the pin strikes the outer end of the slot thus limiting the outward movement of the bar and guide. Thus it will be apparent that the guide 28 and the pin 33 perform the double function of acting as both a lock and guide means for the movable side bar.

The guard consists of a round metal bar 39 pivotally secured at its lower end to the fixed side bar by means of a forked fitting 40 which is pivotally secured by a bolt 41 to a lug 42 on the lower bracket 15, the fitting 40 being movable in a slot 43 in the bottom bar 12. The bar 39 fits within a lengthwise extending slot 44 in the fixed bar 13 and is provided with a forked fitting 45 at its upper end which preferably engages with the adjacent stall upright when the stanchion is open thus guarding the space between this upright and the fixed bar of the stanchion to prevent the animal entering its head in this space. The guard being mounted on the lower bracket it is of course movable with the fixed bar to any desired position of adjustment.

The means for moving the guard simultaneously with the movable side bar consists of a link 46 disposed within the hollow of the bottom bar 12 pivotally connected at one end to the side bar 14 by a bolt 47 passing through the fitting 22 and pivotally secured at its other end 48 to the guard, the link passing through the slot 27 in the block 25.

In case the guard is used with a non-adjustable stanchion the link is directly pivotally connected to the guard but in the case of the adjustable stanchion I have shown an adjustable connection consisting of a sleeve 49 within the bottom bar in which the end 48 of the link is adjustably secured by a set screw 50, accessible from the outside through the slot 43, said sleeve being carried by a pin 51 pivotally mounted in the fitting 40 at the lower end of the bar 39, this construction permitting of the varying of the effective length of the link on the adjustment of the fixed side bar 13. It will be noted that the link is pivotally connected to the guard below its point of pivotal support and pivotally connected to the movable side bar at a point above its pivotal support with the result that on the swinging of the side bar to open and closed position there will be a corresponding swinging movement of the guard.

With the construction above described on the proper adjustment of the side bar 13 to fit the animal and a corresponding adjustment of the effective length of the link 46, when it is desired to open the stanchion, the operator unlocks the locking guide member 28 with one hand and with the same hand moves the movable side bar 14 and its guide member outwardly to guarding position, whereupon the guard through the linkage connection previously described is moved outwardly to guarding position as shown in dotted lines in Fig. 1. This operation serves to effectually guard the space between the sides of the stanchion and the adjacent stall uprights by preventing the animal from entering its head between the stanchion and the stall uprights when the animal is driven into the stall. On the movement of the movable side bar 14 to closed position the guard bar 39 moves inwardly to position within the fixed bar 13, the locking guide member 28 automatically engaging with the locking pin 33, the guard bar not interfering with the free movements of the animal within the stall. By this construction practically no more effort is necessary to operate the guard than to operate the side bar, the operator cannot neglect to operate the guard on the opening and closing of the stanchion and the moving parts are inclosed when the stanchion is closed to prevent interference with the animal and render the construction sanitary.

It will be noted that by mounting the guard on the stanchion when the stanchion is once set up in the stall the guard is also in position thus giving an advantage over the movable sure-stops secured to the stall frame which have to be separately installed and thus saving expense of installation and expense in the guard itself due to the simplicity of its construction.

I am aware that the details of construction shown and described herein are capable of considerable variation and modification and such changes in structure as come within the scope of the appended claims are within the spirit of my invention.

What I claim as my invention is:

1. In a stanchion, the combination, with the relatively fixed parts thereof including a hollow bottom bar, of a movable side bar pivotally secured to said parts at its lower end, a guard pivotally secured to said parts at its lower end, and means disposed within the hollow of the bottom bar and connected to said guard and said side bar for simultaneous movement of said guard and side bar.

2. In a stanchion, the combination, with the relatively fixed parts thereof including a hollow bottom bar, of a movable side bar pivotally secured to said parts at its lower end, a guard pivotally secured to said parts at its lower end, a link disposed within the hollow of the bottom bar and pivotally connected to said guard and said side bar for simultaneous movement of said guard and side bar, and means for locking the stanchion closed.

3. The combination, with an adjustable stanchion, including a fixed bar and a movable side bar adjustable with respect to each other, of a movable guard mounted on the stanchion adjacent the fixed bar, and means operatively and adjustably connected with said guard and movable side bar whereby said guard is moved simultaneously with said movable side bar.

4. In a stanchion, the combination with the top bar, fixed side bar, bottom bar and swinging side bar, of a movable guard pivotally connected at its lower end to the lower portion of the stanchion adjacent the fixed side bar, and means connected to the lower portions of the guard and swinging side bar whereby said guard is moved simultaneously with the movable side bar.

5. In a stanchion, the combination with the top and bottom bars, a fixed side bar adjustably secured to said top and bottom bars, a swinging side bar, and means for locking the stanchion closed, of a movable guard mounted on the fixed side bar and adjustable therewith, and means operatively connected with the guard and swinging side bar for moving the guard simultaneously with said side bar.

6. In a stanchion, the combination of a hollow top bar, a movable side bar, a guide member connected to said side bar and slidable within the top bar, locking guide means within said top bar and secured thereto coöperating with the guide member to guide the movable side bar, said guide member having a locking latch coöperating with said locking guide means to lock the stanchion closed and having a part extending beyond the top bar whereby said member may be unlocked by the operator with one hand.

7. In a stanchion, the combination of a hollow top bar, a movable side bar, a guide member connected to the side bar and slidable within the top bar, a locking guide pin passing through said top bar and coöperating with the guide member to guide the movable side bar, and a locking latch on the guide member coöperating with said pin to lock the side bar closed, said guide member having a part extending beyond the top bar whereby said member may be unlocked by the operator with one hand.

8. In a stanchion, the combination of a hollow top bar, a movable side bar, a guide member pivotally connected to the side bar and slidable within the top bar, locking guide means within the top bar and connected thereto, locking guide means in the guide member coöperating with said top bar locking guide means and automatically operable to lock said side bar closed when it is moved to closed position, said guide member having a part extending beyond the top bar whereby said member may be unlocked by the operator with one hand.

9. In a stanchion, the combination of a hollow top bar, a movable side bar, a guide member connected to the side bar and slidable within the top bar and having a guide opening therein, a locking guide pin secured to the top bar and within the same and running in the opening in the guide member, a locking latch on the guide member at one end of the opening for automatically lockingly engaging said pin when the side bar is moved to closed position, and a handle on the guide member without the top bar for lifting the latch to open the stanchion.

10. In a stanchion, the combination, with the relatively fixed parts thereof including a hollow bottom bar, and an adjustable fixed bar, of a movable side bar pivotally secured to said parts at its lower end, a guard pivotally secured to said parts, a link disposed within the hollow of the bottom bar and operatively connected to said guard and side bar for simultaneous movement of said guard and side bar, means for varying the effective length of the link on the adjustment of the fixed bar, and means for locking the stanchion closed.

In testimony whereof, I affix my signature.

LOUIS O. FRENCH.

Copies of this patent may be obtained for five cents each, by addressing the "Commissioner of Patents, Washington, D. C."